(12) United States Patent
Pingili et al.

(10) Patent No.: US 10,375,645 B2
(45) Date of Patent: Aug. 6, 2019

(54) POWER MANAGEMENT VIA COORDINATION AND SELECTIVE OPERATION OF TIMER-RELATED TASKS

(71) Applicant: Microsoft Technology Licensing, LLC, Redmond, WA (US)

(72) Inventors: Sudeesh R. Pingili, Sammamish, WA (US); Bharath Siravara, Issaquah, WA (US); Martin Regen, Immenstadt (DE); Ray Brown, Woodinville, WA (US); Justin Mann, Beijing (CN); Stephane Karoubi, Mountain View, CA (US); Li Xu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 15/625,590

(22) Filed: Jun. 16, 2017

(65) Prior Publication Data
US 2017/0289916 A1 Oct. 5, 2017

Related U.S. Application Data

(63) Continuation of application No. 14/548,068, filed on Nov. 19, 2014, now Pat. No. 9,693,313, which is a
(Continued)

(51) Int. Cl.
*G08C 17/00* (2006.01)
*H04W 52/02* (2009.01)
(Continued)

(52) U.S. Cl.
CPC ...... *H04W 52/0261* (2013.01); *G06F 1/3206* (2013.01); *G06F 9/4418* (2013.01);
(Continued)

(58) Field of Classification Search
CPC ......... H04W 52/0261; H04W 52/0251; H04W 4/20; G06F 1/3206; G06F 9/4418;
(Continued)

(56) References Cited

U.S. PATENT DOCUMENTS 5,173,653 A 12/1992 Hochstein
5,838,957 A 11/1998 Rajaraman
(Continued)

FOREIGN PATENT DOCUMENTS

CA 2669222 5/2008
CA 2364747 11/2009
(Continued)

OTHER PUBLICATIONS

Chou et al., "An Efficient Measurement Report Mechanism for Long Term Evolution Networks," *IEEE Int'l Symp. on Personal Indoor and Mobile Radio Communications*, pp. 197-201 (Sep. 2011).
(Continued)

*Primary Examiner* — Chuong T Ho
(74) *Attorney, Agent, or Firm* — Klarquist Sparkman, LLP

(57) ABSTRACT

Mobile computing device power consumption can be reduced by using expiration window timers, state-based timers and/or the coordination of keep-alive timers. A mobile computing device can execute tasks associated with multiple keep-alive timers used for maintaining communication links between the device and cloud-based service providers in a single active state. A cloud-based keep-alive service can maintain mobile computing device-service provider communication links by sending one keep-alive communication to a mobile computing device in place of multiple communications. Upon receiving a response, the keep-alive surface can send a plurality of keep-alive
(Continued)

communications to a plurality of cloud-based service providers.

18 Claims, 10 Drawing Sheets

Related U.S. Application Data continuation of application No. 13/057,738, filed as application No. PCT/CN2010/080289 on Dec. 27, 2010, now Pat. No. 8,898,487.

(51) Int. Cl.
  *G06F 9/4401* (2018.01)
  *G06F 1/3206* (2019.01)
  *H04W 4/20* (2018.01)

(52) U.S. Cl.
  CPC ......... *H04W 4/20* (2013.01); *H04W 52/0251* (2013.01); *Y02D 10/44* (2018.01); *Y02D 70/00* (2018.01); *Y02D 70/142* (2018.01); *Y02D 70/144* (2018.01); *Y02D 70/164* (2018.01)

(58) Field of Classification Search
  CPC .. Y02D 70/142; Y02D 70/164; Y02D 70/144; Y02D 70/00; Y02D 10/44
  USPC ......................................................... 370/311
  See application file for complete search history.

(56) References Cited

U.S. PATENT DOCUMENTS

| | | | |
|---|---|---|---|
| 5,974,552 A | 10/1999 | Lim et al. | |
| 6,418,535 B1 | 7/2002 | Kulakowski et al. | |
| 6,952,734 B1 | 10/2005 | Gunlock | |
| 7,551,911 B2 | 6/2009 | Shohara et al. | |
| 7,641,011 B2 | 1/2010 | Fridlington, Jr. et al. | |
| 8,086,884 B2 | 12/2011 | Naffziger | |
| 8,612,984 B2 | 12/2013 | Bell, Jr. et al. | |
| 8,838,744 B2 * | 9/2014 | Fiatal | H04L 51/24 709/203 |
| 8,898,487 B2 * | 11/2014 | Pingili | G06F 1/3206 713/300 |
| 9,693,313 B2 * | 6/2017 | Pingili | G06F 1/3206 |
| 2003/0088544 A1 | 5/2003 | Kan et al. | |
| 2006/0013160 A1 | 1/2006 | Haarsten | |
| 2007/0066222 A1 | 3/2007 | Tao | |
| 2007/0099678 A1 | 5/2007 | Kim et al. | |
| 2008/0112312 A1 * | 5/2008 | Hermsmeyer | H04L 45/00 370/228 |
| 2009/0089481 A1 | 4/2009 | Kapoor et al. | |
| 2009/0210878 A1 | 8/2009 | Huang | |
| 2009/0271517 A1 * | 10/2009 | Naylor | H04L 69/28 709/227 |
| 2009/0305732 A1 | 12/2009 | Marcellino et al. | |
| 2009/0320031 A1 | 12/2009 | Song | |
| 2009/0325533 A1 | 12/2009 | Lele et al. | |
| 2010/0153765 A1 | 6/2010 | Stemen et al. | |
| 2010/0161172 A1 | 6/2010 | Bjelkstal | |
| 2010/0185882 A1 | 7/2010 | Arnold et al. | |
| 2010/0271176 A1 | 10/2010 | Kim et al. | |
| 2010/0299455 A1 | 11/2010 | Master et al. | |
| 2010/0333113 A1 | 12/2010 | Johnson et al. | |
| 2011/0307884 A1 | 12/2011 | Wabe et al. | |

FOREIGN PATENT DOCUMENTS

| | | |
|---|---|---|
| CN | 1647563 | 7/2005 |
| CN | 1940804 | 4/2007 |
| CN | 101449482 | 6/2009 |
| CN | 102322820 | 12/2012 |
| CN | 102322850 | 12/2012 |
| EP | 1890503 | 2/2008 |
| GB | 2496133 | 5/2013 |
| JP | 2008-182641 | 8/2008 |
| KR | 10-0889747 | 3/2009 |
| WO | WO 2008/060906 | 5/2008 |

OTHER PUBLICATIONS

Communication Pursuant to Rule 164(1) EPC, received in counterpart EP Application No. 10861501.4, dated Aug. 29, 2016, 8 pages.
First Office Action and Search Report received in Chinese Patent Application No. 201080070951.6, dated Mar. 31, 2015, 19 pages.
International Preliminary Report on Patentability for PCT Application No. PCT/CN2010/080289, dated Jul. 11, 2013, 2 pages.
International Search Report for PCT Application No. PCT/CN2010/080289, dated Oct. 13, 2011, 4 pages.
Jin et al, "Incorporating Fuzziness into Timer-Triggers for Temporal Event Handling," *IEEE Int'l Conf. on Information Reuse and Integration*, pp. 325-329 (Jul. 2008).
Mukherjee et al., "Protocol and Control Mechanisms to save terminal energy in IEEE 802.16 networks," Communications, Computers and Signal Processing, 2005, Pacrim 2005 IEEE Pacific Rim Conference on Victoria, BC, Canada, Aug. 24-26, 2005, pp. 5-8.
Notice on Grant of Patent dated Apr. 14, 2016, from Chinese Patent Application No. 201080070951.6, 4 pages.
"Recommendations for Reducing Power Consumption of Always-on Applications Version 1.0," downloaded from http://sw.nokia.com/id/ee207667-1bbb-4340-9c56-fb01c20acca5/Recommendations_for_Reducing_Power_Consumption_v1_0_en.pdf 28 pages (document marked Sep. 26, 2007).
Second Office Action received in Chinese Patent Application No. 201080070951.6, dated Dec. 23, 2015, 6 pages.
Supplementary Partial European Search Report, received in counterpart EP Application No. 10861501.4, dated Aug. 19, 2016, 2 pages.
"Timers, Timer Resolution, and Development of Efficient Code," downloaded from: http"//download.microsoft.com/download/3/0/2/3027D574-C433-412A-A8B6-5E0A75D5B237/Timer-Resolution.docx, 11 pages (document marked Jun. 16, 2010).
"Windows Timer Coalescing," downloaded from http://www.microsoft.com/whdc/system/pnppwr/pwermgmt/timercoal.mspx, 9 pages, (document dated Jan. 20, 2009).
Written Opinion of the International Searching Authority for PCT Application No. PCT/CN2010/080289, dated Oct. 13, 2011, 4 pp.
Zhang et al., "Simplex Optimization Localization Algorithm for Wireless Sensor Networks," *Int'l Conf. on Networks Security, Wireless Communications and Trusted Computing*, pp. 254-257 (Apr. 2010).
Office Action received in European Patent Application No. 10861501.4, dated Dec. 22, 2016, 8 pages.
Supplementary Partial European Search Report, received in counterpart EP Application No. 10861501.4, dated Nov. 30, 2016, 6 pages.

* cited by examiner

POWER MANAGEMENT VIA COORDINATION AND SELECTIVE OPERATION OF TIMER-RELATED TASKS

CROSS REFERENCE TO RELATED APPLICATIONS

This application is a continuation of U.S. patent application Ser. No. 14/548,068, filed Nov. 19, 2014, which is a continuation of U.S. National Stage patent application Ser. No. 13/057,738, filed Feb. 4, 2011, which claims the benefit of International Application No. PCT/CN2010/080289, filed Dec. 27, 2010, entitled "POWER MANAGEMENT VIA COORDINATION AND SELECTIVE OPERATION OF TIMER-RELATED TASKS," all of which are incorporated herein by reference in their entireties.

FIELD

The present disclosure relates to power management for mobile computing devices through the use of timers with expiration windows, state-based timers and/or the coordination of keep-alive timers.

BACKGROUND

Mobile computing device power consumption and energy efficiency are influenced by the amount of processor activity, including periodic activity from applications and device drivers. Mobile computing devices can reduce their power consumption, and thus increase their battery life, by entering into a low-power state during periods of idle time between executing instructions for software activity. However, processor power management technologies can require a minimum amount of idle time to obtain a net power-savings benefit. If the mobile computing device is idle for only very short periods of time, the power that is required to enter and exit the low-power state can be greater than the power that is saved.

Mobile computing devices operate software and hardware timers to coordinate device activities. Such timers can be used to wake a mobile computing device from a low-power state to perform periodic activities such as checking email or updating a mobile computing device display. However, upon the expiration of a timer, there may not be much for a device to do. For example, there may be no new email messages for a device to send to a remote email server. Further, a mobile computing device may awaken only to perform operations that are not necessary, such as updating a display that is currently disabled.

A mobile computing device in communication with cloud-based service providers can operate keep-alive timers to ensure that the communication links between the device and the service providers are maintained. These keep-alive timers can also be operated and maintained by the service providers. Multiple keep-alive timers can be employed if a mobile computing device is operating multiple applications in communication with multiple service providers. As various keep-alive timers can be operated at different frequencies, or at similar frequencies but with offset expiration times, a mobile computing device can service multiple keep-alive timers with very little idle time between timer expirations.

Thus, there is a need for the improved coordination and selective operation of timer-related tasks to manage mobile computing device power consumption.

SUMMARY

Techniques are disclosed that provide for reduced mobile computing device power consumption through the coordination and selective operation of timer-related tasks. In particular, power consumption reduction techniques are disclosed that use timers having expiration windows, state-based timers, and/or coordination of keep-alive timers.

In some embodiments, a timer can be associated with an expiration window. Such a timer can expire between a minimum expiration time and a maximum expiration time. Upon detecting a trigger event that causes a mobile computing device to transition from a low-power state to an active state, the mobile computing device can determine whether any other timers, such as those that have an expiration window, are capable of expiring. The device can examine all such expiration window timers, or a subset thereof (e.g., expiration window timers that are associated with tasks that utilize a resource in common with that used by the tasks associated with the trigger event). If so (for timers with expiration windows that are capable of expiring), the mobile computing device executes the tasks associated with the expiration window timers, along with the tasks associated with the trigger event, in a single active state. The mobile computing device then transitions back to a low-power state.

In other embodiments, mobile computing devices can employ state-based timers to reduce power consumption. A state-based timer is associated with the presence or absence of one or more mobile computing device states or a state of one or more mobile computing device components. Upon expiration of a state-based timer, the associated tasks will be performed if the device or specified components are in the designated states. Such states include, for example, whether a mobile computing device wireless communication resource or display is enabled, whether the device is in an idle state, or if the device is externally powered.

In further embodiments, multiple keep-alive timers can be coordinated to avoid sending multiple keep-alive communications between a mobile computing device and cloud-based service providers so as to maintain communication links therebetween. For example, a mobile computing device can coordinate multiple keep-alive timers by using expiration window timers to send keep-alive communication to multiple service providers in a single active state instead of sending a keep-alive communication to each provider in separate active states. Alternatively, a cloud-based keep-alive service can send a single keep-alive communication to a mobile computing device in place of multiple keep-alive communications to avoid causing the mobile computing device to repeatedly enable and disable wireless communication resources to service the multiple keep-alive communications.

The foregoing and other objects, features, and advantages of the invention will become more apparent from the following detailed description, which proceeds with reference to the accompanying figures.

DETAILED DESCRIPTION

The present application describes techniques and tools for managing mobile computing device power consumption through the coordination and selective operation of timer-related tasks. By employing timers that are capable of expiring within an expiration window, a mobile computing device in a low-power state can batch the tasks associated with multiple timers, service multiple timers upon waking and thus avoid having to wake up to service each expiring timer individually. The power consumption of a mobile computing device can also be reduced through the use of state-based timers. Tasks associated with a state-based timer can be performed if the mobile computing device, or one of its components, is in (or, alternatively, not in) a specified state. Coordination of keep-alive timers can also provide for mobile computing device power savings. A mobile computing device executing multiple applications in communication with various cloud-based service providers can service multiple keep-alive timers in a single active state. Keep-alive timers can be operated by the service providers as well, and a cloud-based keep-alive service can coordinate these cloud-based keep-alive timers. The keep-alive service can send a single keep-alive message to a mobile computing device to maintain multiple communication links between the device and the service providers, in place of individual keep-alive messages associated with expiring keep-alive timers for the respective service providers. By reducing the number of device wake-ups, the methods and tools described herein can increase the time a device spends in a low-power state, which can allow the device to enter into "deeper" low power states that consume even less power.

Consider, for example, a mobile computing device that runs on battery power. Techniques and tools described herein allow the device to coordinate its system activities (whether internal to the device, related to cloud services, or both) based on different states of the device or its components, so that battery power lasts longer per charge cycle. By reducing the number of times that the device wakes from a low-power state to perform device housekeeping activities and/or communications with cloud services, and by performing more available tasks when the device does wake to perform any given task, the device is able to stay in the low-power state for longer periods of time, and battery power is conserved.

Figure 1:
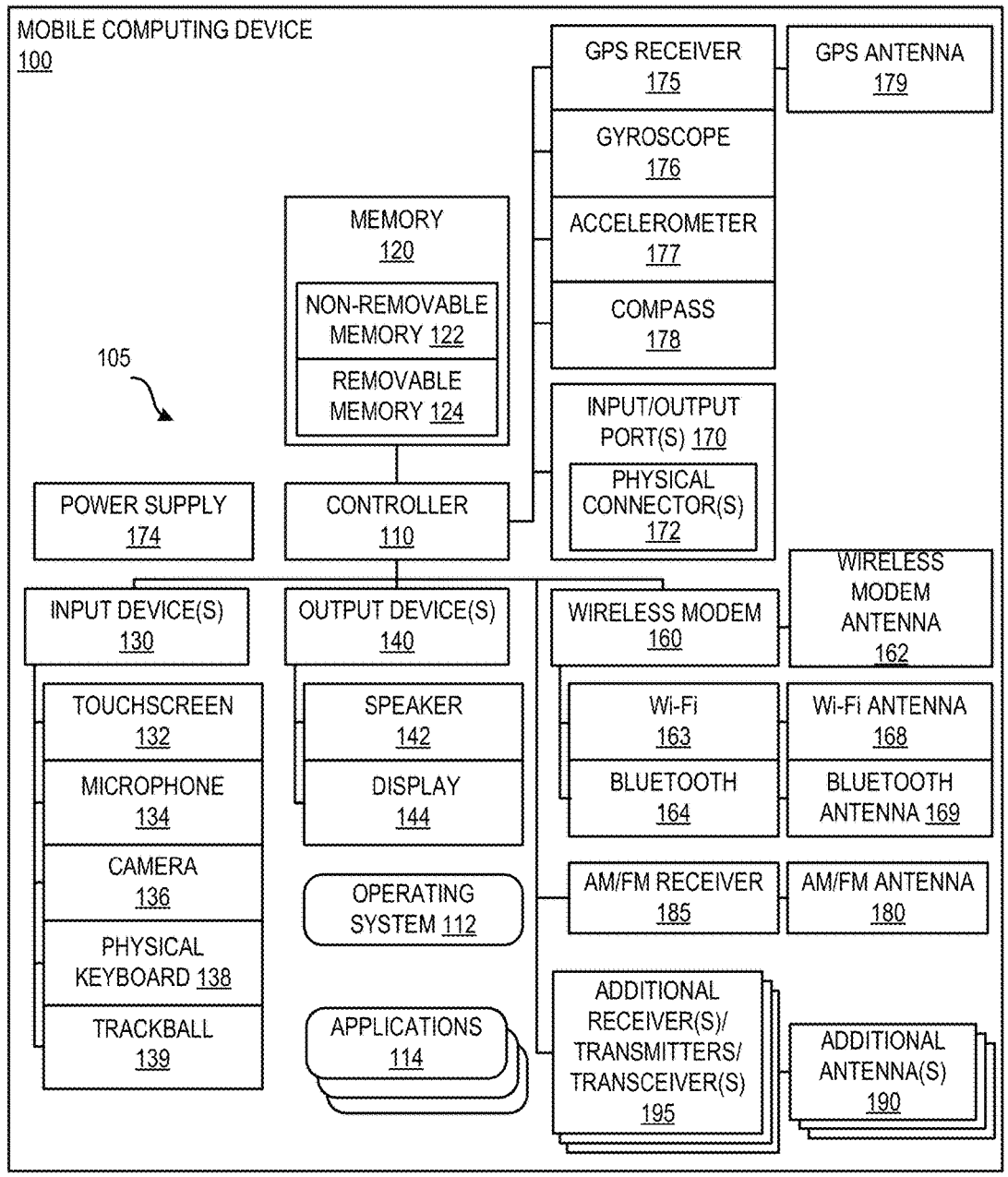
FIG. 1 is a block diagram of an exemplary mobile computing device.

FIG. 1 is a block diagram of an exemplary mobile computing device 100 that can be used to perform some of the methods described herein. The mobile computing device 100 can include a variety of optional hardware and software components 105. Generally, components 105 in the mobile computing device 100 can communicate with other components, although not all connections are shown, for ease of illustration.

The illustrated mobile computing device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 105 and support for one or more application programs 114. The application programs can include common mobile computing applications (e.g., email applications, calendars, contact managers, web browsers, messaging applications), or any other computing application.

The illustrated mobile computing device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM (Global System for Mobile Communication) systems, or other well-known memory storage technologies, such as "smart cards." The memory 120 can be used for storing data and/or code for running the operating system 112 and the applications 114. Example data can include web pages, text, images, sound files, video data or other data sets to be sent to and/or received from one or more network servers or other devices by the mobile computing device 100 via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile computing device 100 can support one or more input devices 130, such as a touch screen 132, microphone 134, camera 136, physical keyboard 138 and/or trackball 139 and one or more output devices 140, such as a speaker 142 and a display 144. Other possible output devices (not shown) can include piezoelectric or other haptic output devices. Some devices can serve more than one input/output function. For example, touchscreen 132 and display 144 can be combined in a single input/output device. Any of the input devices 130 or the output devices 140 can be internal or external to the mobile computing device 100.

A wireless modem 160 can be coupled to a wireless modem antenna 162 and can support two-way communications between the mobile computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the mobile computing device and a public switched telephone network (PSTN).

The mobile computing device 100 can further include at least one input/output port 170 (which can be, for example, a USB port, IEEE 1394 (FireWire) port, and/or RS-232 port) comprising physical connectors 172, a power supply 174, a satellite navigation system receiver such as a GPS receiver 175, gyroscope 176, accelerometer 177 and compass 178. The GPS receiver 175 can be coupled to a GPS antenna 179. The mobile computing device 100 can additionally include an AM/FM antenna 180 coupled to an AM/FM receiver 185 for receiving radio signals broadcast by an AM/FM radio signal transmitter. The mobile computing device 100 can further include one or more additional antennas 190 coupled to one or more additional receivers, transmitters and/or transceivers 195 to enable various additional functions. For example, mobile computing device 100 can include an additional antenna 190 coupled to an additional receiver 195 configured to receive and process a digital audio radio service (DARS) signal for output at the mobile computing device 100 or an attached accessory.

Although the various antennas are shown as separate hardware components of the mobile computing device 100, they can be incorporated into other components. For example, GPS antenna 179 can be incorporated into the GPS receiver 176. In addition, antennas shown as separate in FIG. 1 can be implemented as a single antenna. For example, the AM/FM antenna 180 and the GPS antenna 179 can be a single antenna shared by GPS receiver 176 and AM/FM receiver 185. Furthermore, multiple antennas can be connected to a switch to allow a component to be coupled to one of several antenna sources, or to more than one antenna source. For example, the AM/FM receiver 185 can be connected to a switch (not shown) that allows either the AM/FM antenna 180 or an antenna external to the mobile computing device 100 to be used as the AM/FM receiver antenna source. The switch can also be configured to allow both the AM/FM antenna 180 and an external antenna, or multiple antennas to be simultaneously used as antenna sources for the receiver 185. The illustrated components 105 are not required or all-inclusive, as any components can be deleted and other components can be added.

Figure 2:
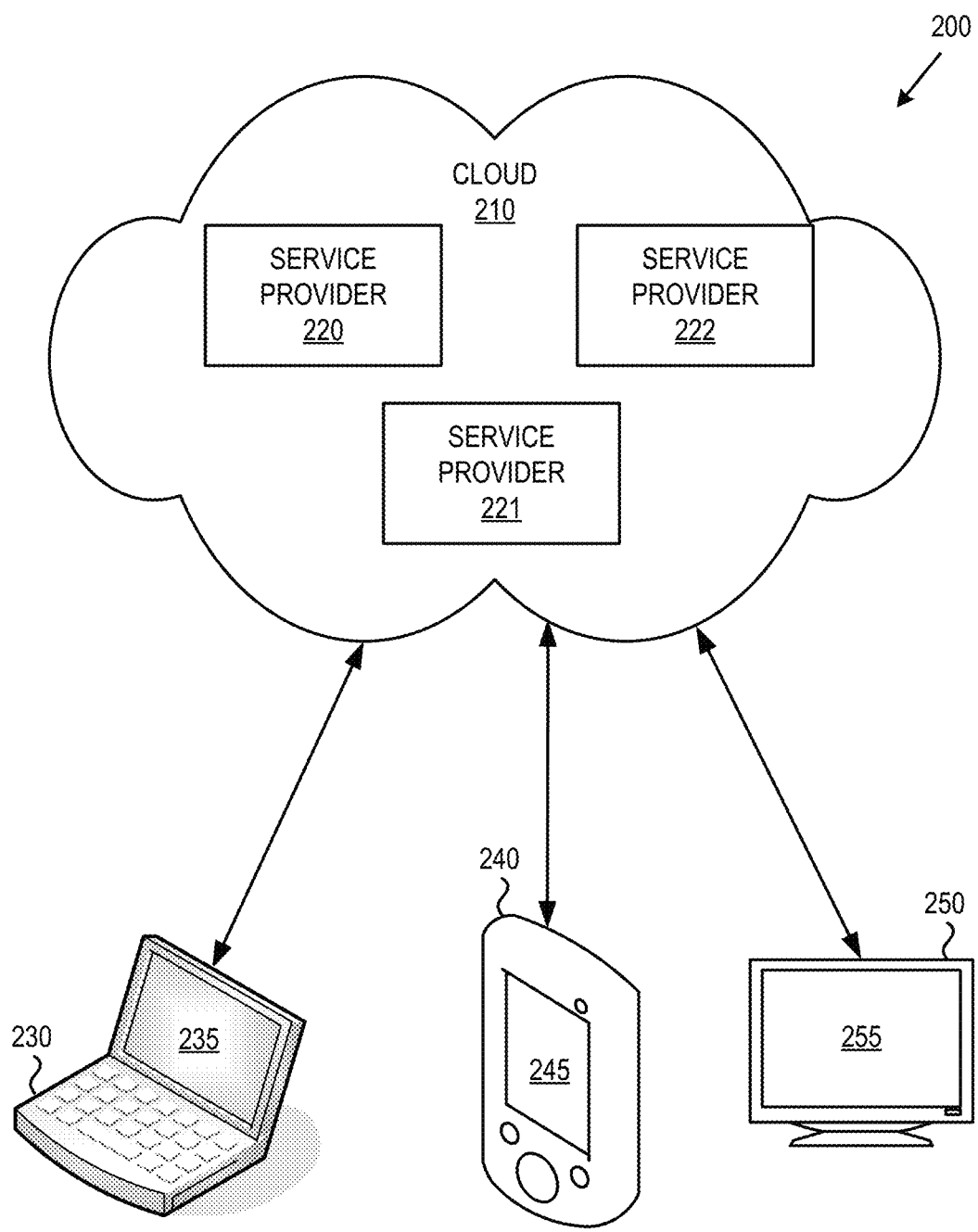
FIG. 2 is a block diagram of a cloud computing environment in which the exemplary mobile computing device of FIG. 1 can operate.

FIG. 2 illustrates a generalized example of a suitable implementation environment 200 in which described embodiments, techniques, and technologies may be implemented.

In example environment 200, various types of services (e.g., computing services) are provided by a cloud 210. For example, the cloud 210 can comprise a collection of computing devices, which may be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a personal computer such as desktop computer, laptop, notebook, netbook or the like. Connected device 240 represents a mobile computing device with a mobile computing device screen 245 (e.g., a small-size screen). For example, connected device 240 could be a mobile phone, smart phone, personal digital assistant, tablet computer or the like. Connected device 250 represents a device with a large screen 255. For example, connected device 250 could be a television with Internet connectivity, or a television connected to another device capable of connecting to the cloud such as a set-top box, gaming console or the like. One or more of the connected devices 230, 240, 250 can include touch screen capabilities. Devices without screen capabilities also can be used in example environment 200. For example, the cloud 210 can provide services for one or more computers (e.g., server computers) without displays.

Services can be provided by the cloud 210 through service providers 220-222, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking, website hosting and the provision of office productivity applications.

In example environment 200, the cloud 210 provides the technologies and solutions described herein to the various connected devices 230, 240, 250 using, at least in part, the service providers 220-222. For example, the service providers 220-222 can provide a centralized solution for various cloud-based services. The service providers 220-222 can manage service subscriptions for users and/or devices (e.g., for the connected devices 230, 240, 250 and/or their respective users).

Timers, Generally

A mobile computing device or any component thereof can operate a timer to be used to coordinate or synchronize activities of the mobile computing device. In some embodiments, timers are digital counters that increment or decrement at a specified frequency and that can interrupt a hardware or software component of the mobile computing device. Timers can be periodic timers that are associated with, for example, housekeeping tasks (e.g., flash memory management, TCP/IP stack handling) and that are reset upon expiry, or one-shot timers that are initiated upon the mobile computing device entering a specified state. A timer can be implemented by any software or firmware component of a mobile computing device, such as an operating system, application programs or firmware associated with any of the hardware components contained in the mobile computing device. A timer can also be a hardware timer implemented by a hardware component of the mobile computing device.

A timer can be associated with one or more tasks, activities or operations (generally, tasks) that are executed by a mobile computing device or component thereof upon expiration of the timer. For example, an email software application can utilize a timer to periodically (e.g., every 5, 10 or 15 minutes) connect with an email service provider to retrieve and send messages. In another example, a mobile computing device controller can utilize timers to schedule periodic housekeeping tasks such as updating a mobile computing device display or sampling an input device.

Timers can be used in mobile computing devices to reduce power consumption. For example, a mobile computing device or any mobile computing device component can be placed in a low-power state such as an idle, hibernation or sleep state to extend battery life. Placing a mobile computing device in a low-power state can comprise placing one or more of the software or hardware components in a low-power state. A hardware component can be placed in a low-power state, for example, by setting the component's enable pins to the appropriate input levels indicating that the component is to be disabled, operating the component at a reduced frequency or by reducing the power supply voltage to the component. A software component can be placed in a low-power state by, for example, reducing the frequency at which software routines are performed, or by preventing select software routines from operating entirely while in low-power mode.

A mobile computing device operating in a low-power state can operate a timer that indicates that the mobile computing device or a component thereof should transition from a low-power state to an active state upon expiration of the timer in order to execute tasks associated with the expired timer. For example, referring back to FIG. 2, mobile computing device 240 can use a timer to periodically exit from a low-power state to check for new email or SMS/MMS messages from a cloud-based service provider 220-222. The mobile computing device 240 can transition from the low-power state to an active state, enable the necessary hardware components (e.g., a wireless modem) to communicate with the cloud-based service providers 220-222, and download/upload any new messages from/to the email server. After the tasks associated with the timer have been executed, the mobile computing device can return to a low-power state.

It is to be understood that reference to a mobile computing device operating in a low-power state can refer to a mobile computing device in which fewer than all components of the mobile computing device are in a low-power state, and that reference to a mobile computing device operating in an active state can refer to a mobile computing device in which fewer than all of the components of the mobile computing device are in an active state. Thus, a mobile computing device operating in a low-power state can comprise one or more components operating in an active state, and a mobile computing device operating in an active state can comprise one or more components operating in a low-power state.

Timers can be initialized, operated and monitored by any of various components of a mobile computing device. Expiration of a timer can be detected by any of various components of the mobile computing device, including components that are in a low-power state. A component monitoring a timer can send a signal to another component in the mobile computing device that the timer has expired.

Expiration Windows Timers

Figure 3:
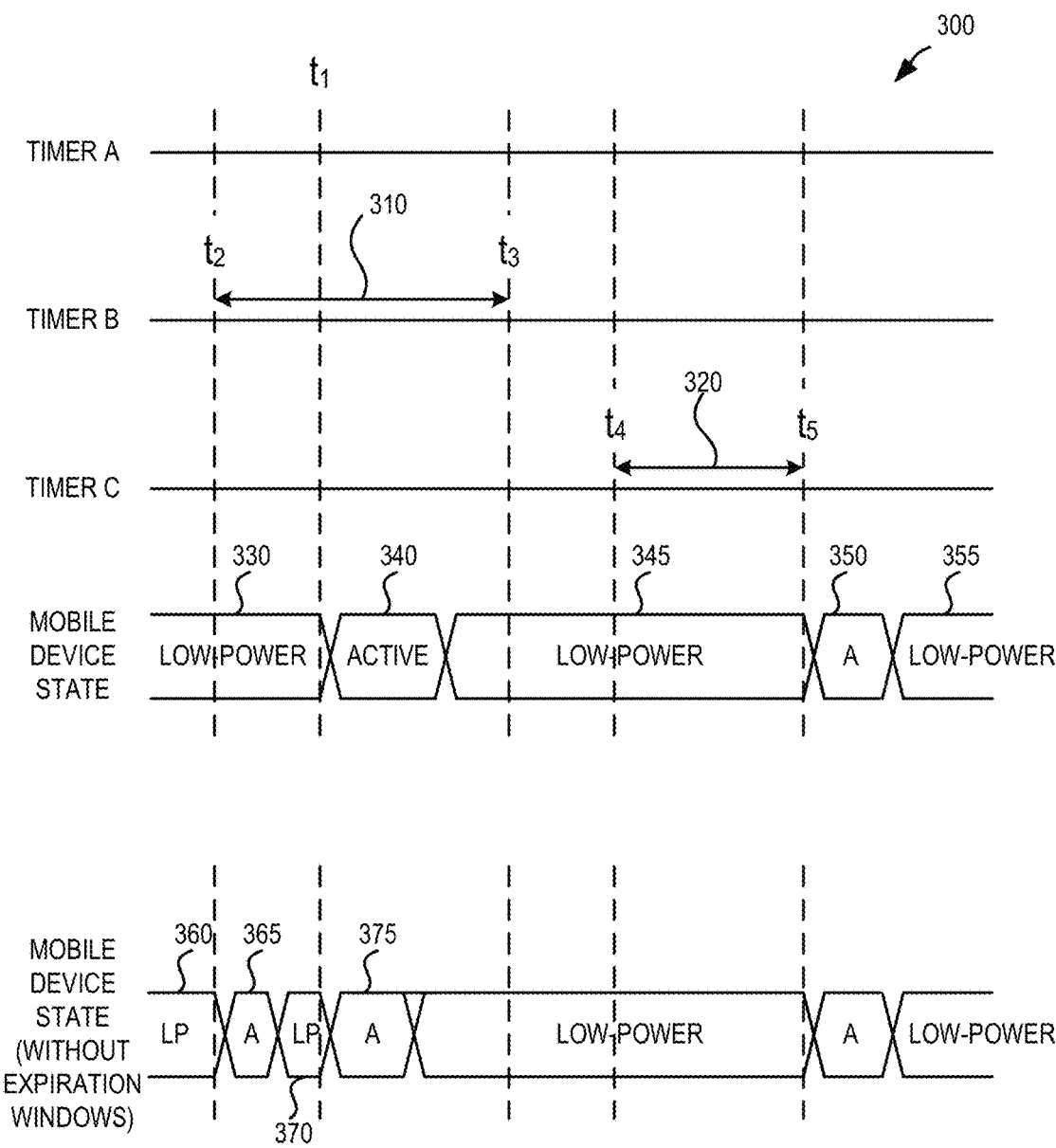
FIG. 3 is a first timing diagram showing the expiration of timers with expiration windows.

FIG. 3 is a first timing diagram showing the operation of exemplary timers with expiration windows. A timer having an expiration window (expiration window timer) can expire at any time between its associated minimum expiration time and maximum expiration time. Thus, an expiration window timer can expire at the minimum expiration time or at the maximum expiration time, or at any time in between. Timer A is a conventional timer that expires at time t1. Timer B is an expiration window timer having an expiration window 310, which has a minimum expiration time t2 and a maximum expiration time t3. Timer C is an expiration window timer having an expiration window 320, which has a minimum expiration time t4 and a maximum expiration time t5.

The time at which a timer associated with an expiration window expires can depend upon a trigger event indicating that the mobile computing device is to transition from an idle state to an active state to execute tasks associated with the trigger event. In some embodiments, the trigger event can be the expiration of another timer (set to expire at a specific time or with an expiration window) or the detection of an interrupt by the device's controller or other mobile computing device component. If the trigger event occurs at a time that occurs within the expiration window associated with another timer, that other timer is determined to be expired, and the tasks associated with the other timer are executed in addition to the tasks associated with the trigger event.

For example, Timer A in FIG. 3 can be associated with retrieving email messages from an email service, Timer B can be associated with retrieving SMS/MMS messages from a SMS/MMS service, and Timer C can be associated with retrieving updates from a social networking service. The email, SMS/MMS and social networking services can be provided by cloud-based service providers. At a time prior to t2, the mobile computing device can be in a low-power state 330. Timers A, B and C are running; none have expired. At time t2, expiration window 310 is reached, and Timer B is capable of expiring. Between t2 and t1, Timer B continues to run and does not expire as no trigger event has occurred to cause the mobile computing device to transition out of the low-power state 330.

At time t1, Timer A expires and the mobile computing device transitions from the low-power state 330 to an active state 340 to check for new email messages. In response to detecting the expiration of Timer A, the mobile computing device determines whether the current time, t1, occurs within the expiration windows 310, 320 of Timers B and C. As t1 occurs within expiration window 310, Timer B is determined to have expired and the mobile computing device executes the tasks associated with Timer B. That is, the mobile computing device checks for new SMS/MMS messages from the SMS/MMS service. Thus, the tasks associated with Timers A and B are executed within the same active state. After the tasks associated with Timers A and B are completed, the mobile computing device can transition from the active state 340 to the low-power state 345.

At time t4, expiration window 320 is reached, and Timer C is now capable of expiring. Between t4 and t5, Timer C continues to run and does not expire as no additional trigger event has occurred to cause the mobile computing device to transition to an active state. The mobile computing device remains in low-power state 345. At time t5, the end of expiration window 320 is reached and Timer C is determined to have expired. Accordingly, the mobile computing device transitions to an active state 350 (labeled state "A") and executes the tasks associated with Timer C. At a time after t5, execution of the tasks associated with Timer C is completed and the mobile computing device enters low-power state 355 (labeled state "LP").

As each mobile computing device state transition consumes power, expiration window timers provide a way for reducing mobile computing device power consumption. State transitions for a mobile computing device with a Timer B' expiring at time t2 rather than having expiration window 310, are shown at the bottom of FIG. 3. As can be seen, a mobile computing device with a Timer B' not having an expiration window undergoes an additional set of transitions due to the expiration of Timer B' at a time t2 (state transitions 360 to 365, and 365 to 370), resulting in increased power consumption. Further power savings can be realized if any of the batched tasks associated with multiple timers can be performed in parallel, thus reducing the time spent by the device in the active state. For example, if any the tasks associated with Timers A and B can be performed in parallel, the duration of the active state 340 could be less than the total duration of active states 365 and 375.

In some embodiments, the duration of an expiration window is short relative to the maximum time that the timer is allowed to run. For example, if a timer associated with the periodic pulling and pushing of messages from/to an email service is set to expire every ten minutes, the corresponding expiration window duration can be on the order of ones or tens of seconds. In another example, a timer associated with updating or refreshing a mobile computing device display that is set to expire, at the longest, every ⅓₀th of a second can have an expiration window on the order of ones or tens of milliseconds. Thus, the variation in the length of time that a timer can run before expiring can be small enough such that a user of the mobile computing device does not notice the variation, or that the performance of a software application employing expiration window timers is not adversely affected. For example, if a user sets a mobile computing device to check for new email messages every ten minutes, the user will likely not notice that new email messages are sent and received several seconds longer than ten minutes. In other embodiments, the duration of the expiration window can be on the order of the maximum expiration time. For example, a timer can be set to expire at a minimum of eight seconds or at a maximum of twelve seconds from the current time. In this example, the duration of the expiration window is four seconds, one-third of the maximum expiration time of twelve seconds.

Figure 4:
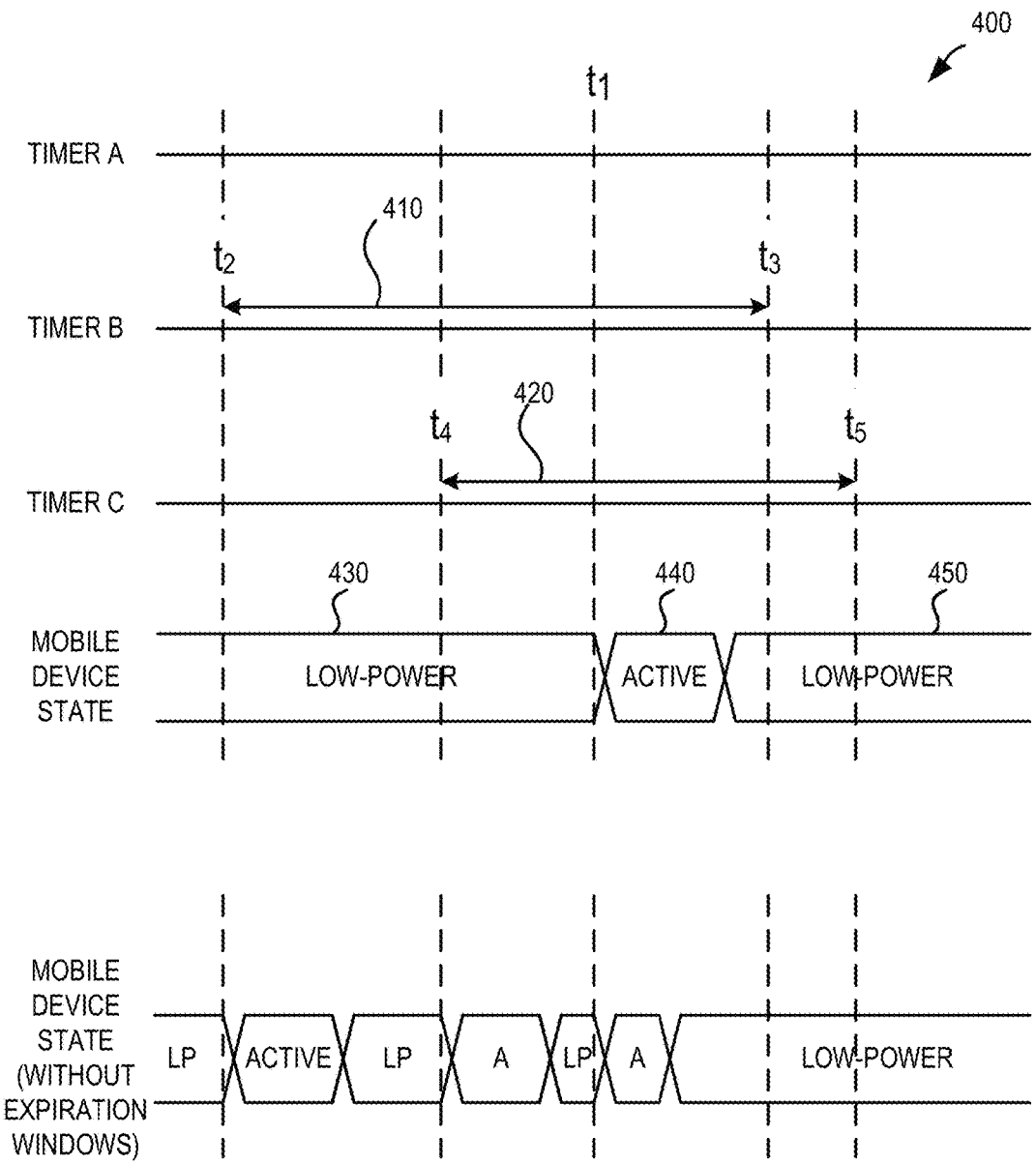
FIG. 4 is a second timing diagram showing the expiration of timers with expiration windows.

FIG. 4 is a second timing diagram showing the expiration of exemplary timers with expiration windows. In this example, the time at which Timer A expires, t1, occurs within the expiration windows 410, 420 associated with Timers B and C, respectively. Accordingly, the mobile computing device makes only one set of transitions between low-power to active states (e.g., state transitions 430 to 440, and 440 to 450) to service all three timers. Thus, the mobile computing device checks for email messages, SMS/MMS messages and social network updates within a single active state 440. After these tasks have been completed, the mobile computing device transitions to low-power state 450. The occurrence of time t1 within the expiration windows 410, 420 results in reduced mobile computing device power consumption relative to a mobile computing device employing Timers A, B' and C' that expire at times t1, t2, and t4 respectively. As shown in the state transition diagram at the bottom of FIG. 4, the use of timers without expiration windows results in three sets of state transitions, instead of the single set of state transitions in a mobile computing device using timers with expiration windows.

Figure 5:
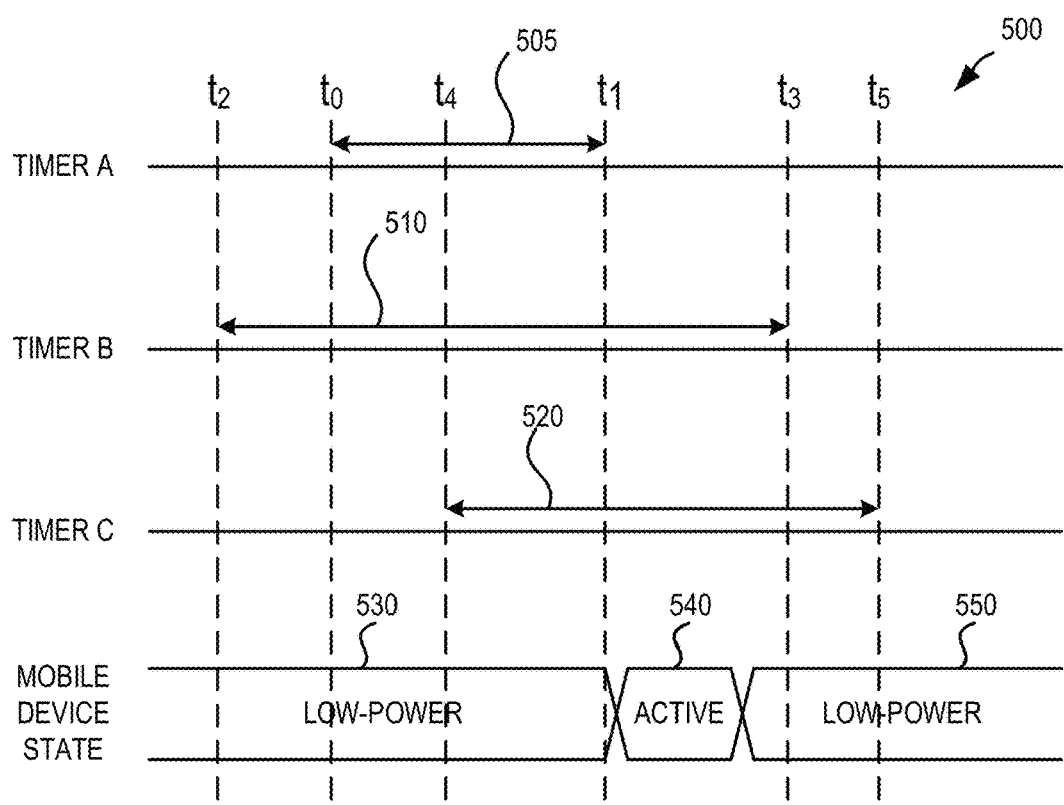
FIG. 5 is a third timing diagram showing the expiration of timers with expiration windows.

FIG. 5 is a third timing diagram showing the expiration of timers with expiration windows. Timer A can expire within an expiration window 505 having a minimum expiration time t0 and maximum expiration time t1, rather than expiring at a specific expiration time. Timers B and C have expiration windows 510 and 520, respectively. In the example, if Timers A-C are the only mobile computing device timers, and there are no other trigger events that cause the mobile computing device to transition from a low-power state to an active state, Timer A can expire at time t1, when the end of expiration window 505 is reached. The mobile computing device can transition from low-power state 530 to active state 540, determine that time t1 occurs within expiration windows 510 and 520, and execute the tasks associated with Timers A-C during active state 540. After completion of the tasks, the mobile computing device can transition to low-power state 550.

Any of the timers described herein can be associated with either an expiration window or a specific expiration time. For example, the number of parameters supplied to a timer initialization software routine can determine whether a timer can expire within an expiration window or at a specific time. A timer initialization software procedure called with tmin and tmax parameters can initiate an expiration window timer having an expiration window with minimum expiration time tmin and maximum expiration time tmax, and the same initialization procedure called with just one timing parameter can initiate a timer that expires at the specified time. Instead of using minimum and maximum expiration times, an expiration window can alternatively be specified with an expiration time and range value, where the range value is a window centered around the expiration time, beginning with the expiration time, or ending with the expiration time.

Figure 6A:
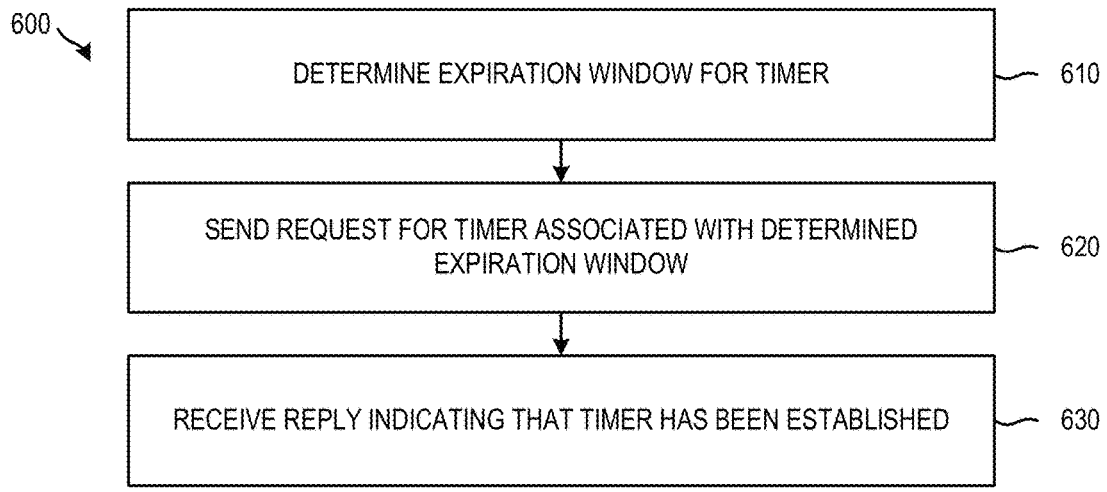
FIG. 6A is a block diagram of an exemplary method of establishing an expiration window timer.

FIG. 6A is a block diagram of an exemplary method 600 of establishing an expiration window timer. The method 600 can be performed, for example, by a mobile computing device executing an email application that connects to a cloud-based email service provider roughly every five minutes to check for the presence of new messages. At 610, an expiration window for the timer is determined. In the example, the computing device can determine that a timer indicating when the device is to next connect to the email service provider is to have an expiration window that spans four minutes thirty seconds to five minutes from the present time. At 620, a request for a timer having the determined expiration window is sent. In the example, the device can request a timer that has an expiration window that spans from four minutes thirty seconds to five minutes from the current time. The request can be sent from the email application to a component of the mobile computing device operating system, or other device component. At 630, a reply indicating establishment of the timer is received. In the example, the email application can receive an indication from the operating system that the email service timer has been established. The method 600 can further comprise operations performed by the operating system or other component for the timer service, for example, receiving the timer request.

Figure 6B:
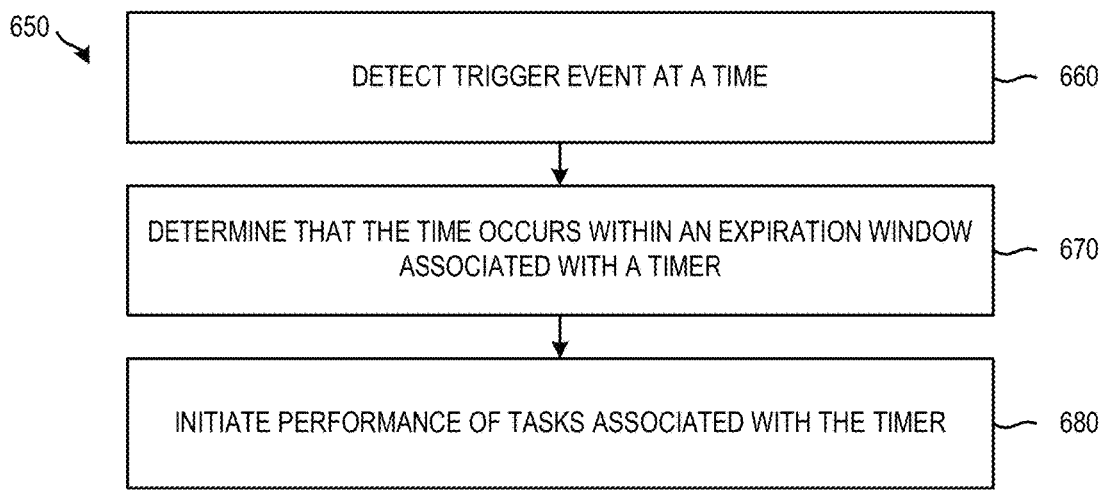
FIG. 6B is a block diagram of an exemplary method of coordinating tasks of a mobile computing device using expiration window timers.

FIG. 6B is a block diagram of an exemplary method 650 of coordinating tasks of a mobile computing device using expiration window timers. The method 650 can be performed, for example, by a mobile computing device operating in a low-power state and operating an expiration window timer that can control when the mobile computing device is to wake up and connect with a cloud-based email service to check for any new messages. At 660, a trigger event is detected, the trigger event indicating that a mobile computing device or a mobile computing device component is to transition from a low-power state to an active state. In the example, the mobile computing device can detect the expiration of a timer that indicates the mobile computing device is to awake to connect to a SMS/MMS service to check for new messages. At 670, the time that the trigger event was detected is determined to fall within an expiration window associated with a timer, the timer being associated with one or more tasks. In the example, the mobile computing device can determine that the time the SMS/MMS timer expired occurs within the expiration window associated with the running email timer. At 680, the mobile computing device initiates performance of the one or more tasks associated with the timer. In the example, the mobile computing device can connect with the email service to check for new email messages.

The method 650 can include completing the tasks associated with the timer and returning to the low-power state. In the example, the mobile computing device can re-enter the low-power state after completing the tasks of connecting with the email and SMS/MMS servers and checking for new messages. The detected trigger event can be associated with one or more first tasks, and the time that the trigger event occurs can be determined to be within the expiration window of one or more timers associated with one or more second tasks that utilize a common mobile computing device resource as the first tasks. For example, if the mobile computing device is to wake from a low-power state in response to detecting the expiration of a SMS/MMS timer, the mobile computing device can determine whether any timer associated with tasks requiring the use of wireless communication resources (e.g., wireless modem 160) is capable of expiring. In some cases, the time of the trigger event can be determined to occur within expiration windows associated with multiple timers, and the method 650 can comprise initiating the performance of tasks associated with each of the multiple timers. The method 650 can also comprise performing the tasks associated with the timers, in addition to or in place of initiating performance of the tasks.

State-Based Timers

Any of the timers described herein can be state-based timers. Tasks associated with a state-based timer can be performed if the timer has expired and the mobile computing device or a component thereof is in (or, alternatively, not in) a specified state. The device or component state associated with a timer can be specified when the timer is requested or initialized by the mobile computing device or one of its components. Thus, a state-based timer can be associated with a state condition, which can depend on a device state of a mobile computing device and/or a component state of a component of the mobile computing device. State-based timers provide opportunities for reducing mobile computing device power consumption by preventing the execution of tasks that, for example, may not be necessary for the mobile computing device to perform given the current state of the mobile computing device. Further, a state-based timer can be associated with conditional logic indicating whether, for example, tasks associated with the timer are to be performed only if the device/component condition is satisfied, unless the device/component condition is satisfied, or as soon as the device/component condition is satisfied and the timer has reached an expiration window within which the state-based timer is permitted to expire.

In some embodiments, a state-based timer can be associated with a state indicating that a mobile computing device display is enabled. For example, the state can indicate that all or a portion of the backlight light emitting diodes (LEDs) in a liquid crystal display (LCD) are enabled. Tasks associated with such timers include those related to drawing, updating or refreshing all or a portion of a mobile computing device display. A mobile computing device display can be disabled due to, for example, the device detecting a period of user inactivity or a mode of operation where the device display does not need to be enabled (e.g., detecting that a mobile phone is being held to a user's ear by detecting a low-light environment while the user is on a phone call).

In other embodiments, a state-based timer can be associated with the mobile computing device or a component thereof being in a low-power state. Tasks associated with such timers can be designated not to be performed if the mobile computing device or specified component is in a low-power state. Such tasks include display refresh/update tasks, cache management and flash writer tasks, automated backup tasks (e.g., backing up data stored locally on the mobile computing device to an external store) and logging tasks (e.g., generation of application run-time logs for debugging).

In further embodiments, a state-based timer can be associated with a state that indicates that a wireless communication resource of the mobile computing device is enabled. Tasks associated with such timers can be performed if the indicated wireless communication resource is enabled. For example, a state-based timer associated with tasks responsible for pushing/pulling email from/to a remote server can be configured such that the email push/pull tasks will only be performed if a specified wireless communication resource is enabled when the timer expires. State-based timers can be associated with tasks that can be executed when other resources (e.g., input or output devices) of a mobile computing device are enabled or disabled as well.

In still other embodiments, a state-based timer can be associated with a state that indicates that a mobile computing device is externally powered. Such a timer can be associated with an expiration window. If the minimum expiration time of an expiration window is reached, and the mobile computing device is externally charged, tasks associated with such a state-based timer can be performed at the minimum expiration time. Thus, state-based timers can provide for varying performance modes based on the current power configuration (e.g., externally- or internally-powered) of a mobile computing device.

In any of the embodiments described herein, a state-based timer can be associated with multiple device states of the mobile computing device and/or multiple component states of one or more of its components. For example, a state-based timer can be configured such that its associated tasks are performed if certain wireless communication resources are enabled and the device is externally charged. In other embodiments, a state-based timer can be associated with a state indicating that an accessory or other peripheral device is attached to the mobile computing device.

Figure 7A:
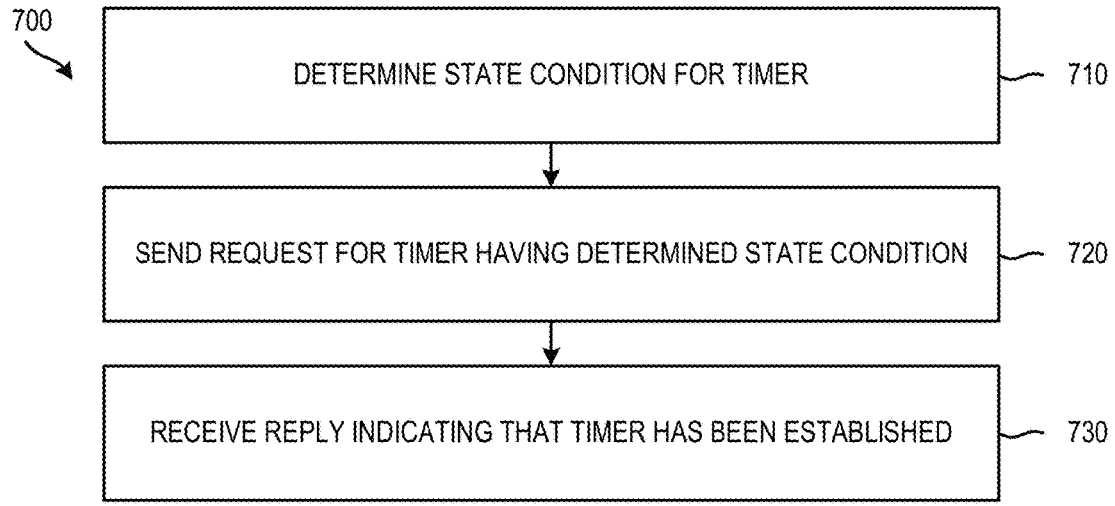
FIG. 7A is a block diagram of an exemplary method of establishing a state-based timer.

FIG. 7A is a block diagram of an exemplary method 700 of establishing a state-based timer. The method 700 can be performed, for example, by a smartphone executing a web browser application and having a display. At 710, a state condition is determined for a state-based timer. In the example, the smartphone can determine a state condition for a timer related to refreshing a cellphone display, the display being refreshed only if the display is enabled. At 720, a request for a timer associated with the determined state condition is sent. In the example, the smartphone can request a timer associated with the device condition that the display be enabled. The request can be sent from a component of the smartphone operating system responsible for display refresh tasks, or from the web browser application, to an operating system component configured to service timer requests. At 730, a reply indicating establishment of the timer is received. In the example, the requesting operating system component, or web browser application, can receive an indication that a timer associated with a state condition that depends on the cellphone display being enabled has been established.

Figure 7B:
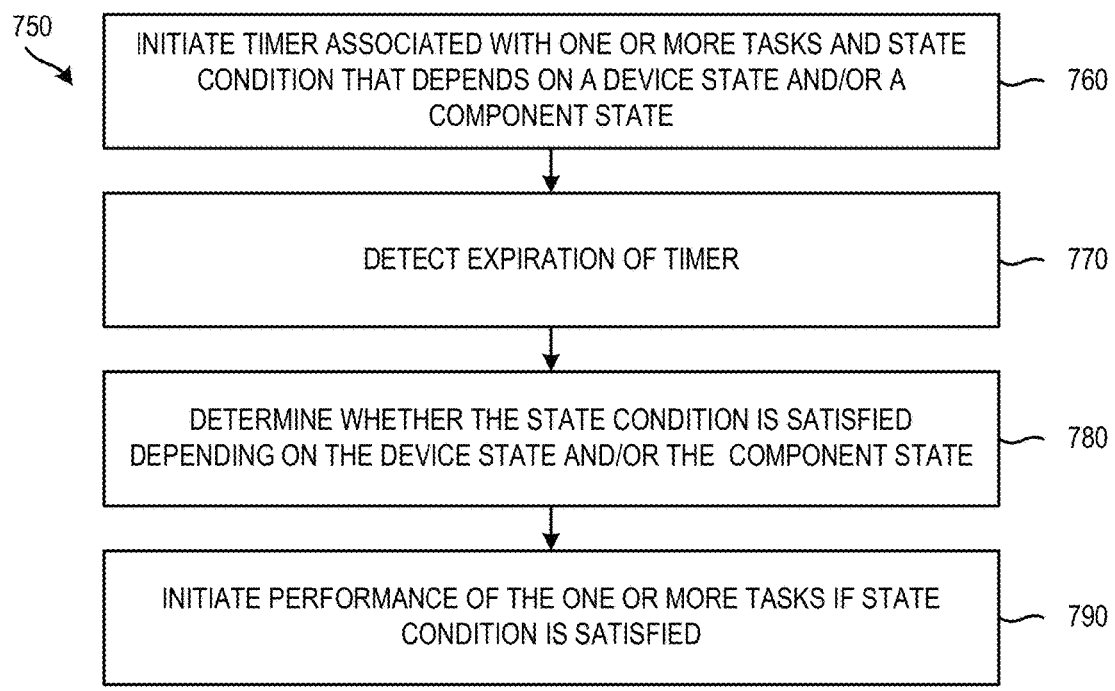
FIG. 7B is a block diagram of an exemplary method of initializing and monitoring a state-based timer and performing tasks associated therewith.

FIG. 7B is a block diagram of an exemplary method 750 of initializing and monitoring a state-based timer and performing tasks associated therewith. The method 750 can be performed, for example, by a mobile phone running an email application with a wireless communication modem. At 760, a timer associated with one or more tasks and a state condition is initialized, wherein the state condition depends on a device state of a mobile computing device and/or a component state of a mobile computing device component. In the example, the smart phone can initiate a state-based timer to coordinate the retrieval and sending of email from/to a remote email server. The email timer can indicate that email push/pull activities are to be performed if the phone's wireless communication modem is enabled. At 770, expiration of the timer is detected. In the example, the mobile computing device can detect the expiration of the email timer. At 780, the mobile computing device determines whether the mobile computing device is in the device state and/or the one or more components are in the one or more components states. In the example, the mobile computing device can determine whether the wireless communication modem is enabled. At 790, performance of the one or more tasks is initiated by the mobile computing device if the state condition is satisfied. In the example, the mobile computing device can perform the email pull/push tasks associated with the email timer if the specified wireless communication resource is enabled.

Coordination of Keep-Alive Timers

In another aspect of the disclosed technologies, keep-alive timers can be coordinated to reduce mobile computing device power consumption. A mobile computing device in communication with a cloud-based service provider can operate a keep-alive timer to maintain a communication link between the device and the service provider. For instance, if a communication link between a mobile computing device and a service provider is scheduled to time-out after fifteen minutes, the mobile computing device can operate a keep-alive timer that causes a message to be sent to the service provider at least every fifteen minutes to maintain the communication link. Tasks associated with a keep-alive timer can include the transmission of a simple keep-alive message that is sent from the mobile computing device to the cloud-service provider to verify that the link between the two is still present (e.g., a "ping" message), or any other task or operation performed by mobile computing device comprising communication with the cloud-based service. Keep-alive communications can be sent at predefined or variable intervals, and each keep-alive timer can be operated at different frequencies, or at the same frequency, but with expiration times offset from one another.

A mobile computing device can operate multiple keep-alive timers having timer characteristics as disclosed herein. For example, keep-alive timers can have expiration windows that allow the mobile computing device to service multiple keep-alive timers simultaneously (e.g. within a single active state). Referring back to FIG. 4, Timers A-C can be three keep-alive timers operated by a mobile computing device executing various applications in communication with cloud-based services. For instance, Timer A can be a keep-alive timer associated with email push/pull tasks of an email application in communication with an email service provider and that expires at time t1. Timer B can be a keep-alive timer associated with SMS/MMS tasks of a messaging application in communication with an SMS/MMS provider and having an expiration window with minimum expiration time t2 and maximum expiration time t3. Timer C can be a keep-alive timer associated with tasks of a social networking application in communication with a social networking service provider and having an expiration window with minimum expiration time t4 and maximum expiration time t5. At a time t1, keep-alive Timer A can expire and the mobile computing device can check to see whether any other keep-alive timers are capable of expiring and determines that time t1 occurs within the expiration windows of keep-alive timers B and C. The mobile computing device can then transition to an active state (e.g., transition from low-power state 430 to active state 440) to execute the tasks associated with keep-alive Timers A-C, thus keeping alive the communication links between the email, SMS/MMS and social networking applications and the corresponding cloud-based service providers. By executing multiple keep-alive tasks in a single active state, mobile computing device power consumption can be reduced by avoiding separate state transitions for each expiring keep-alive timer.

Although FIG. 4 shows a mobile computing device transitioning between low-power states (e.g., states 430 and 450) and active states (e.g., state 440), a mobile computing device may not be in a low-power state when a keep-alive timer expires. For example, a mobile computing device can be in an active state when a keep-alive timer expires and transition to a different active state in which wireless communication resources are enabled. Mobile computing device power savings can still be achieved in such embodiments, since multiple keep-alive timers are serviced without the repeated enabling and disabling of wireless communication resources as each individual keep-alive timer is serviced.

In some embodiments, communication links between multiple cloud-based service providers and a mobile computing device can be maintained by cloud-based services or service providers. For example, email and social networking service providers can operate keep-alive timers to maintain communication links with a mobile computing device executing email and social networking applications. Tasks associated with a keep-alive timer operated by a service provider can comprise the sending and receipt of keep-alive communications between the service provider and the mobile computing device. Keep-alive communications can comprise the provider "pinging" the mobile computing device (e.g., the provider sending a message to the mobile computing device for the purpose of maintaining a communication link and receiving the appropriate response) or sending any other messages or commands to the mobile computing device. Alternatively, a cloud-based keep-alive service can participate in maintaining communication links between cloud-based service providers and mobile computing devices.

Figure 8:
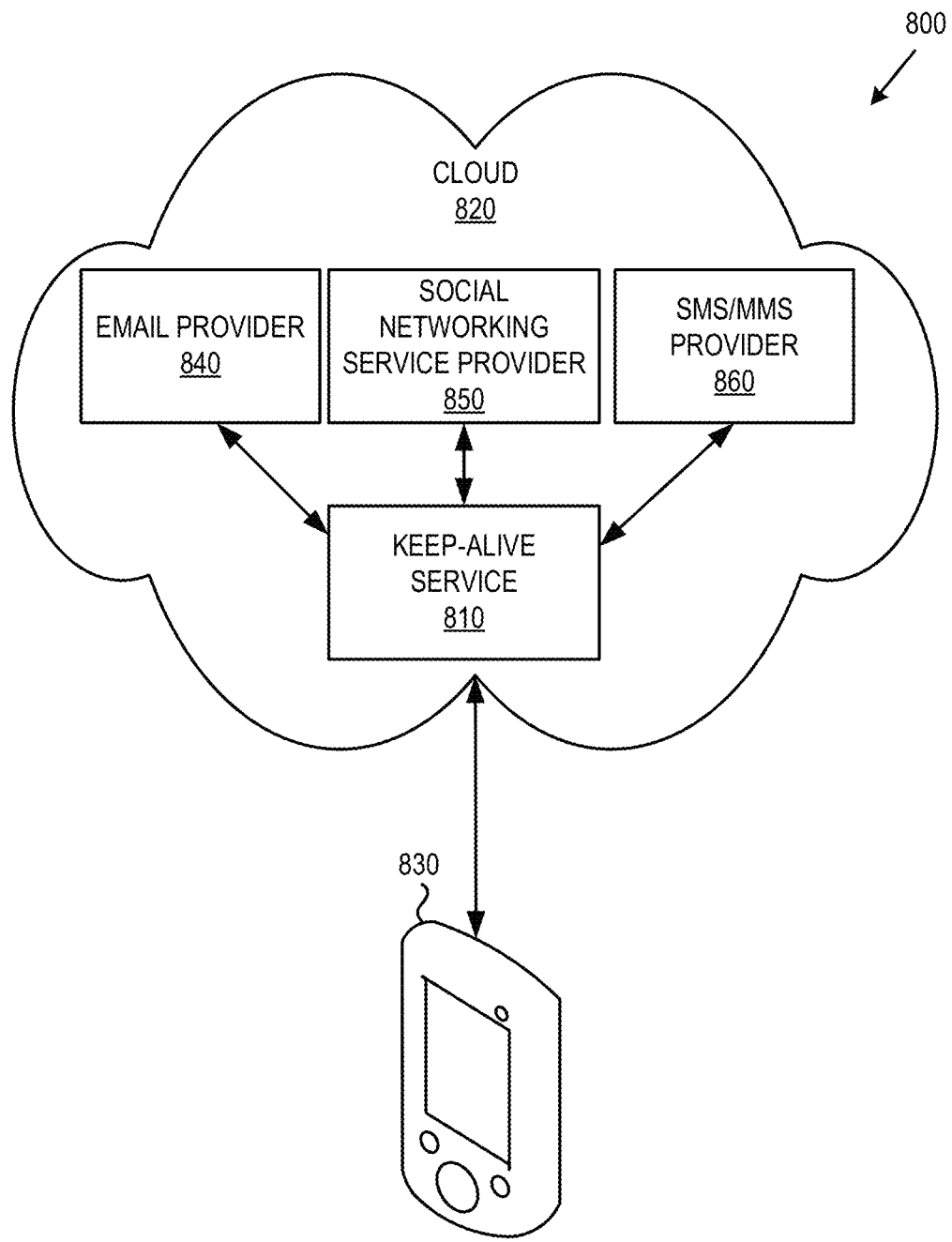
FIG. 8 is a block diagram of a cloud computing environment comprising a keep-alive service.

FIG. 8 shows an exemplary cloud computing environment 800 in which a keep-alive service 810 operating in a cloud 820 can participate in the management of keep-alive communications between a mobile computing device 830 and multiple cloud-based service providers 840, 850, 860. For example, Timers A-C can be keep-alive timers associated with email, social networking service and SMS/MMS providers 840, 850 and 860, respectively. In the absence of keep-alive service 810, a keep-alive communication is sent from one of the providers 840, 850, 860 to the mobile computing device 830 upon expiration of each of the timers A-C. To service each keep-alive communication, the mobile computing device 830 can transition to an active state in which wireless communication resources are enabled to allow communication with the cloud-based providers 840, 850, 860.

A keep-alive service 810 can provide for the maintenance of communications links between the mobile computing device 830 and multiple service providers 840, 850, 860 with reduced mobile computing device power consumption by reducing the number of mobile computing device state transitions. For example, upon expiration of Timer A, the email service provider 840 can send to the keep-alive service 810 a message indicating that Timer A has expired, or a keep-alive message can be sent to the mobile computing device 830. The keep-alive service 810 can check with the social networking service and SMS/MMS providers 850, 860 to determine whether other keep-alive timers are capable of expiring, and determine that Timers B and C are capable of expiring. The keep-alive service 810 can then transmit a keep-alive message to the mobile computing device 830, receive a response from the mobile computing device 830, and send an appropriate message or forward the response to the providers 840, 850, 860 indicating that the mobile computing device 830 remains in communication with the keep-alive service 810, and hence, the service providers 840, 850, 860. Thus, in this example, the mobile computing device 830 consumes less power by servicing one keep-alive message from the keep-alive service 810 instead of three separate keep-alive messages from the providers 840, 850, 860.

In some embodiments, the keep-alive service 810 can transmit the keep-alive response from the mobile computing device 830 to service providers operating or associated with unexpired keep-alive timers. The keep-alive service 810 can be made aware of unexpired keep-alive timers, for example, by being responsible for the operation of the unexpired keep-alive timers or being notified whenever a provider 840, 850, 860 initializes a keep-alive timer. By forwarding the keep-alive response to service providers associated with or operating unexpired timers, the service providers can terminate and/or re-start such timers. Postponing or eliminating future keep-alive timer expiration events can reduce mobile computing device power consumption.

Keep-alive messages transmitted to the mobile computing device 830 from the keep-alive service 810 can contain any portion of a keep-alive message transmitted from the individual service providers 840, 850, 860 to the keep-alive service 810. The keep-alive service 810 can also transmit any portion of a keep-alive response sent from the mobile computing device 830 to the keep-alive service 810 that is intended for a specific provider 840, 850, 860, to the appropriate provider 840, 850, 860.

In some embodiments, keep-alive timers operated within the cloud 820 can be managed by the keep-alive service 810. For example, a service provider 840, 850, 860 can request a keep-alive timer from the keep-alive service 810 having a specific expiration time or an expiration window. Thus, upon expiration of a keep-alive timer within the cloud 820 (either through notification of such an expiration by a provider 840, 850, 860, or through monitoring of keep-alive timers running at the keep-alive service 810), the keep-alive service 810 can check to see whether other keep-alive timers running at the keep-alive service 810 are capable of expiring as well.

Figure 9:
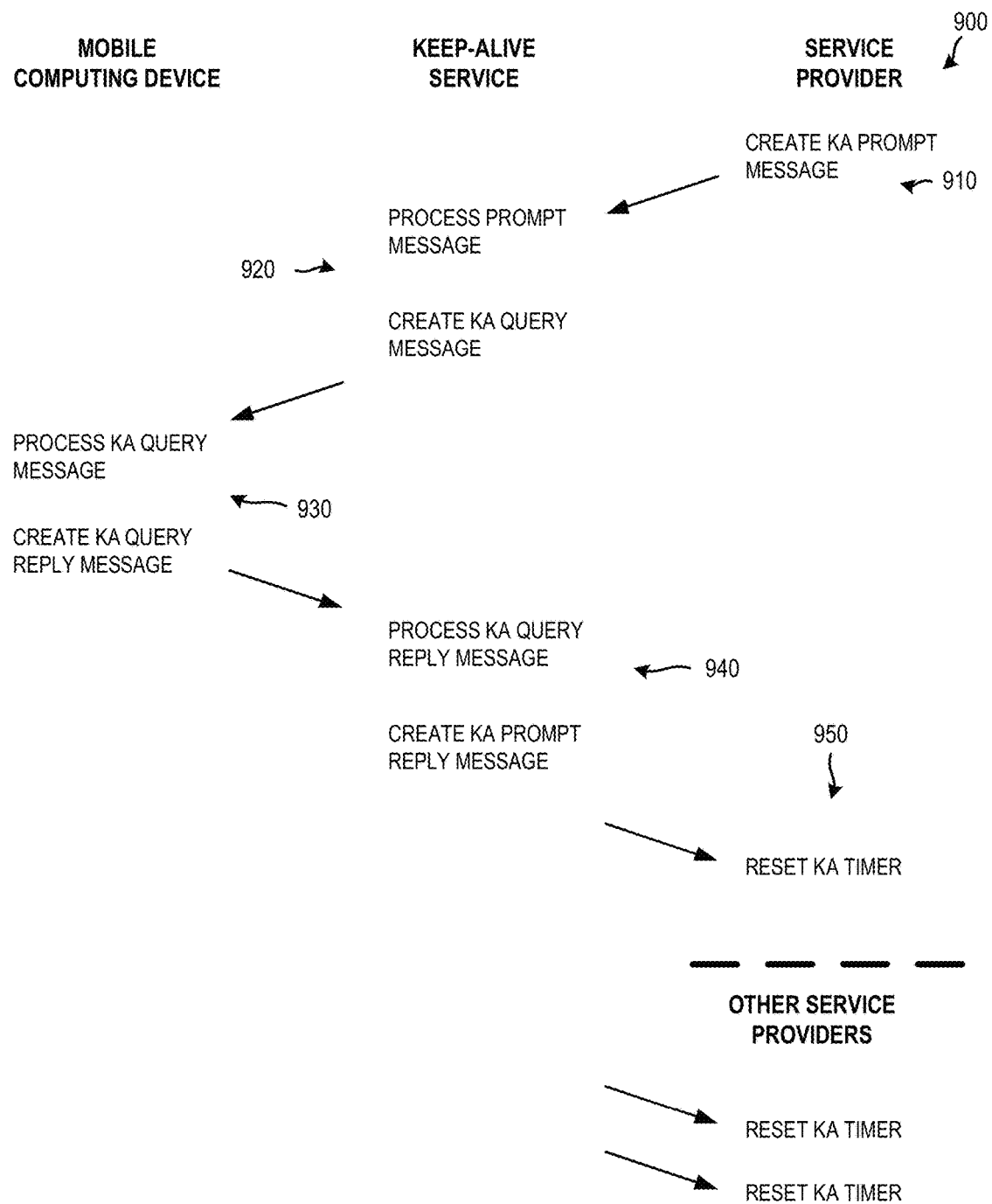
FIG. 9 is a diagram of an exemplary sequence of events in a networked computing system comprising a keep-alive service.

FIG. 9 is a diagram 900 of an exemplary sequence of events in a computing environment comprising at least one service provider in communication with a mobile communication device, and a keep-alive service. The service provider is responsible for maintaining and monitoring a keep-alive (KA) timer associated with maintaining communication between the provider and the mobile computing device. At 910, upon expiration of the keep-alive timer, the service provider can create a keep-alive prompt message to be sent to the keep-alive service. At 920, the keep-alive service processes the keep-alive prompt message and creates a keep-alive query message. Processing of the prompt message can comprise determining which service provider created and sent the prompt message, which mobile computing device the keep-alive prompt message is intended for, etc. Creation of the keep-alive query message can comprise creating a "ping" command or any other message or communication to be sent to the mobile computing device useful for determining whether a communication link to the computing device is still present.

At 930, the mobile computing device processes the keep-alive query message and creates a keep-alive query reply message. Processing of the keep-alive query message can comprise determining which service provider originated the keep-alive prompt message. Creation of the keep-alive reply message can comprise creating any appropriate response to the keep-alive query message. At 940, the keep-alive service processes the keep-alive query reply message and creates a keep-alive prompt reply message. Creating the keep-alive prompt reply message can comprise creating a message identifying the mobile computing device from which the keep-alive query reply message originated, along with additional information such as information about the communication link with mobile computing device. At 950, the service provider can receive the keep-alive prompt message reply and take appropriate action. For example, the service provider can reset an expired keep-alive timer that prompted creation of the keep-alive prompt message. The keep-alive service can also send the keep-alive prompt reply message to additional service providers. Upon receipt of the keep-alive prompt reply message, these additional service providers can, for example, reset or expire their own keep-alive timers associated with maintaining a communication link with the mobile computing device.

Figure 10A:
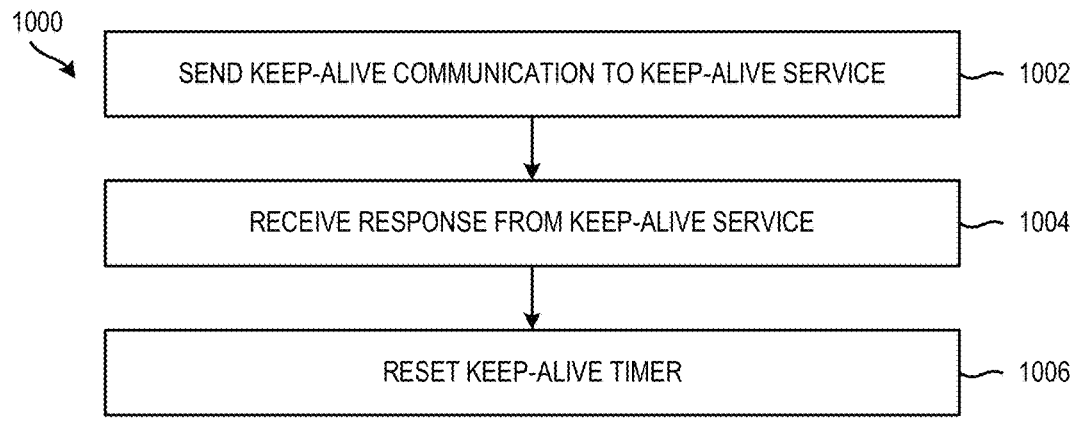
FIGS. 10A-10C are block diagrams of exemplary methods of maintaining communication between a mobile computing device and a plurality of cloud-based service providers.
Figure 10B:
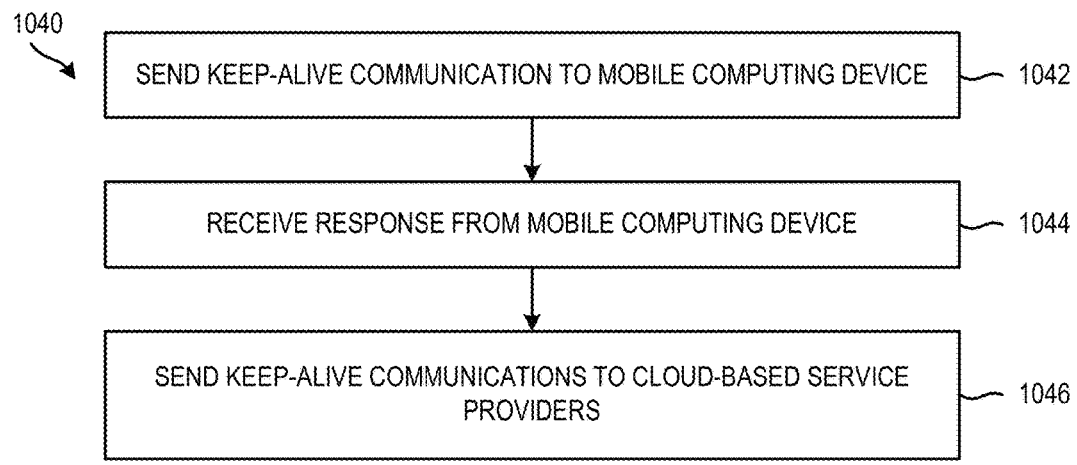
Figure 10C:
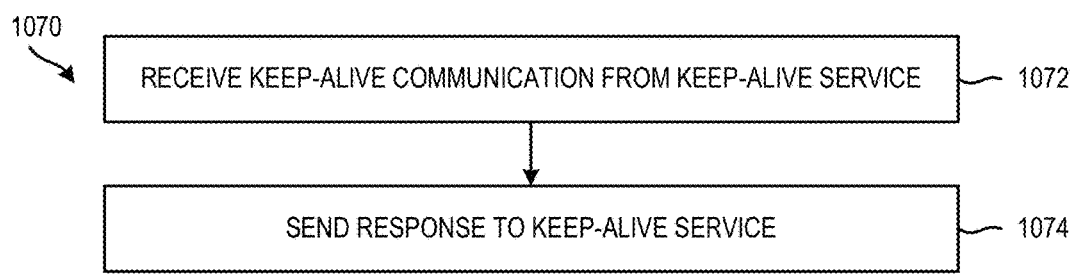

FIGS. 10A-C are block diagrams of an exemplary methods of maintaining communication between a mobile computing device and a plurality of cloud-based service providers. The keep-alive service can be implemented by a networked computing system. The method 1000, shown in FIG. 10A, can be performed, for example, by a cloud-based email service provider providing email services to a mobile computing device and supported by the keep-alive service. At 1002, a keep-alive communication is sent to the keep-alive service. In the example, the keep-alive communication can be sent from the email service provider to the keep-alive service in response to the expiration of a keep-alive timer maintained by the service provider. The keep-alive communication can indicate, for example, that the keep-alive service should query the status of a communication link with the mobile computing device. At 1004, a response is received from the keep-alive service. In the example, the email service provider can receive a response from the keep-alive service indicating the status of the communication link between the service provider and the mobile computing device. At 1006, the keep-alive timer is reset.

The method 1040, shown in FIG. 10B, can be performed by a cloud-based keep-alive service responsible for participating in maintaining communication between email service and SMS/MMS providers and a mobile phone accessing email and messaging services. At 1042, a first keep-alive communication for the keep-alive service is sent to a mobile computing device. In the example, the keep-alive service can ping the mobile phone. At 1044, a response to the first keep-alive communication can be received from the mobile computing device for the keep-alive service. In the example, the keep-alive service can receive a response to the ping command from the mobile phone. At 1046, a plurality of second keep-alive communications for the keep-alive service can be sent to the plurality of cloud-based service providers. In the example, the keep-alive service can send the ping response to the email and messaging service providers.

In some embodiments, the method 1040 can further comprise determining that a keep-alive timer associated with a communication link between one of the plurality of cloud-based service providers and the mobile computing device has expired or is permitted to expire. In the example, the keep-alive service can receive a message from the email service provider that a keep-alive timer associated with a communication link between the email service provider and the mobile phone has expired. The message can comprise a keep-alive message that is to be sent to the mobile phone.

The method 1070, shown in FIG. 10C, can be performed, for example, by a smart phone executing an SMS/MMS application in communication with an SMS/MMS service provider. At 1072, a keep-alive communication is received from the keep-alive service. In the example, the phone receives a keep-alive communication from the keep-alive service. At 1074, a response to the keep-alive service is sent. In the example, the phone sends a response to the received keep-alive communication to the keep-alive service.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises." Moreover, terms indicating timing of an event include timings that vary slightly and insubstantially from the exact, literal meaning of the unmodified term. For example, a timer that is described as capable of expiring at a minimum expiration window time can expire within several clock periods of the expiration window time, wherein the clock period is the period of any signal used by the mobile computing device for timing purposes.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures do not show the various ways in which the disclosed systems, methods and apparatuses can be used in conjunction with other systems, methods and apparatuses. Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile computing devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

We claim:

1. A networked computing system comprising a processor and memory, wherein the networked computing system implements a keep-alive service, the networked computing system being adapted to perform a method of maintaining communication between a mobile computing device and a plurality of cloud-based service providers, the method comprising:

sending a first keep-alive communication for the keep-alive service to the mobile computing device;

receiving a response to the first keep-alive communication from the mobile computing device for the keep-alive service; and responsive to receiving the response to the first keep-alive communication, sending a plurality of second keep-alive communications for the keep-alive service to the plurality of cloud-based service providers, respectively.

2. The networked computing system of claim 1, wherein the method further comprises determining that a keep-alive timer associated with a communication link between one of the plurality of cloud-based service providers and the mobile computing device has expired or is permitted to expire.

3. The networked computing system of claim 2, wherein the determining comprises receiving a keep-alive message from one of the plurality of cloud-based service providers.

4. The networked computing system of claim 2, wherein the sending the first keep-alive communication is performed as a result of the determining.

5. The networked computing system of claim 1, wherein at least one of the plurality of second keep-alive communications is sent to one of the plurality of cloud-based service providers that is operating or associated with an unexpired keep-alive timer.

6. The networked computing system of claim 1, wherein the method further comprises determining that a plurality of keep-alive timers, each associated with a communication link between one of the plurality of cloud-based service providers and the mobile computing device, have expired or are permitted to expire.

7. The networked computing system of claim 6, wherein the sending the first keep-alive communication is performed as a result of the determining.

8. The networked computing system of claim 1, wherein sending the plurality of second keep-alive communications comprises sending the response to the first keep-alive communication to the plurality of cloud-based service providers.

9. A method of maintaining communication between a mobile computing device and a plurality of cloud-based service providers, the method comprising:
　determining that a plurality of keep-alive timers, each associated with a communication link between one of the plurality of cloud-based service providers and the mobile computing device, have expired or are permitted to expire;
　sending a first keep-alive communication for the keep-alive service to the mobile computing device;
　receiving a response to the first keep-alive communication from the mobile computing device for the keep-alive service; and
　sending a plurality of second keep-alive communications for the keep-alive service to the plurality of cloud-based service providers, respectively.

10. The method of claim 9, wherein the determining comprises receiving a keep-alive message from one of the plurality of cloud-based service providers.

11. The method of claim 9, wherein the sending the first keep-alive communication is performed as a result of the determining.

12. The method of claim 9, wherein at least one of the plurality of second keep-alive communications is sent to one of the plurality of cloud-based service providers that is operating or associated with an unexpired keep-alive timer.

13. One or more computer-readable memory storing computer-executable instructions for causing a mobile computing device programmed thereby to perform a method of maintaining communication between the mobile computing device and a plurality of cloud-based service providers, comprising:
　sending a first keep-alive communication for the keep-alive service to the mobile computing device;
　receiving a response to the first keep-alive communication from the mobile computing device for the keep-alive service; and
　responsive to receiving the response to the first keep-alive communication, sending a plurality of second keep-alive communications for the keep-alive service to the plurality of cloud-based service providers, respectively.

14. The one or more computer-readable memory of claim 13, wherein the method further comprises:
　determining that a keep-alive timer associated with a communication link between one of the plurality of cloud-based service providers and the mobile computing device has expired or is permitted to expire, wherein the sending the first keep-alive communication is performed as a result of the determining.

15. The one or more computer-readable memory of claim 14, wherein the determining comprises receiving a keep-alive message from one of the plurality of cloud-based service providers.

16. The one or more computer-readable memory of claim 13, wherein at least one of the plurality of second keep-alive communications is sent to one of the plurality of cloud-based service providers that is operating or associated with an unexpired keep-alive timer.

17. The one or more computer-readable memory of claim 13, wherein the method further comprises determining that a plurality of keep-alive timers, each associated with a communication link between one of the plurality of cloud-based service providers and the mobile computing device, have expired or are permitted to expire, and wherein the sending the first keep-alive communication is performed as a result of the determining.

18. The one or more computer-readable memory of claim 13, wherein sending the plurality of second keep-alive communications comprises sending the response to the first keep-alive communication to the plurality of cloud-based service providers.

* * * * *